(12) United States Patent
Schroeder

(10) Patent No.: US 8,079,611 B2
(45) Date of Patent: Dec. 20, 2011

(54) TRAILER HITCH TOW BAR CADDY

(76) Inventor: Vern Schroeder, Breda, IA (US)

( * ) Notice: Subject to any disclaimer, the term of this patent is extended or adjusted under 35 U.S.C. 154(b) by 2 days.

(21) Appl. No.: 12/649,644

(22) Filed: Dec. 30, 2009

(65) Prior Publication Data

US 2011/0156369 A1    Jun. 30, 2011

(51) Int. Cl.
  *B60D 1/54*    (2006.01)
(52) U.S. Cl. ..................... 280/491.5; 280/472
(58) Field of Classification Search ............... 280/491.1, 280/491.5, 480.1, 472
  See application file for complete search history.

(56) References Cited

U.S. PATENT DOCUMENTS

| | | | |
|---|---|---|---|
| 2,544,185 A | 3/1951 | Sargent | |
| 2,671,674 A | 3/1954 | Derksen | |
| 2,737,399 A | 3/1956 | Halverson | |
| 4,662,647 A | 5/1987 | Calvert | |
| 4,662,677 A | 5/1987 | Hughes | |
| 5,277,448 A | 1/1994 | Colibert | |
| 5,322,315 A | 6/1994 | Carsten | |
| 5,476,279 A | 12/1995 | Klemetsen | |
| 5,489,110 A | 2/1996 | Van Dusen | |
| 6,125,945 A | 10/2000 | Skaggs et al. | |
| 6,149,181 A | 11/2000 | Biederman | |
| 6,203,048 B1 | 3/2001 | Adair | |
| 6,234,512 B1 | 5/2001 | Bettenhausen | |
| 6,712,381 B1 | 3/2004 | Moss | |
| 6,742,799 B1 | 6/2004 | Hansen | |
| 6,789,815 B2 | 9/2004 | Moss et al. | |
| 6,866,285 B1 | 3/2005 | Stamp | |
| 7,055,844 B1 | 6/2006 | Bostedt | |
| 7,100,936 B1 * | 9/2006 | Cheng et al. | .................. 280/495 |
| 7,125,036 B2 | 10/2006 | Moss et al. | |
| 7,195,270 B2 | 3/2007 | Norquay | |
| 7,258,359 B2 | 8/2007 | Wooten | |
| 2002/0017770 A1 | 2/2002 | Parrish | |
| 2004/0150205 A1 | 8/2004 | Deanda | |
| 2006/0220347 A1 | 10/2006 | Witchey | |
| 2007/0228693 A1 | 10/2007 | Witchey | |

OTHER PUBLICATIONS

International Search Report, PCT/US10/60650 mailed Mar. 1, 2011.

* cited by examiner

*Primary Examiner* — Tony H. Winner
(74) *Attorney, Agent, or Firm* — McKee, Voorhees & Sease, P.L.C.

(57) ABSTRACT

Disclosed is an apparatus and method for an adjustable tow bar caddy for stowing a tow bar. The apparatus having a cross member having opposite ends; a tow bar; and a tow bar caddy selectively mounted to the cross member, the longitudinal axis of the tow bar caddy being perpendicular to the longitudinal axis of the cross member. The tow bar caddy being adjustable commensurate to the type of tow bar used and obstructions created by the vehicle frame. A method including the steps of providing a trailer hitch assembly comprising a cross member, a tow bar, and a tow bar caddy; mounting the tow bar caddy to the cross member; and selectively adjusting the longitudinal axis of the tow bar caddy to be horizontally perpendicular or vertically perpendicular to the longitudinal axis of the cross member.

5 Claims, 6 Drawing Sheets

U S 8,079,611 B2

TRAILER HITCH TOW BAR CADDY

BACKGROUND OF THE INVENTION

The invention relates generally to a trailer hitch assembly. More particularly, the present invention relates to an adjustable tow bar caddy which attaches to a cross member of a trailer hitch assembly and allows for stowing of a tow bar.

Prior art trailer hitch assemblies are designed to provide a receiver into which an elongated tow bar is inserted when the tow bar is use, i.e., when tow bar is connected to a trailer; however, these hitch assemblies do not provide suitable means for stowing the tow bar when it is not in use. Sometimes these hitch assemblies leave the tow bar extending rearwardly from the receiver and thus creating problems, for instance, when parallel parking or closing a garage door if the vehicle is parked within a garage. To address this problem some trailer hitch assemblies stow the tow bar proximate to the cross member. However, these hitches do not provide a means for adjustably stowing the tow bar to accommodate varying types of tow bars or different obstructions created by the vehicle frame.

SUMMARY OF THE INVENTION

Therefore it is a primary object, feature, or advantage of the present invention to improve upon the state of the art.

It is a further object, feature, or advantage of the present invention to provide an apparatus and method for supporting a tow bar when the tow bar is removed from the receiver of the trailer hitch assembly.

It comes as still a further object, feature and advantage of the present invention to provide an apparatus and method for a trailer hitch that is adjustable commensurate to the type of tow bar being used and obstructions created by the vehicle frame.

It comes as still a further object, feature and advantage of the present invention to provide a tow bar caddy which can be removed from the cross member of one vehicle and remounted on the cross member of another vehicle within minutes.

Still another object, feature, or advantage of the present invention is to provide a tow bar caddy that does not excessively protrude rearwardly or laterally from a vehicle.

One or more of these and/or other objects, features, and advantages of the present invention will become apparent from the specification and claims that follow. No single embodiment of the present invention need exhibit all of these objects, features, or advantages.

According to one aspect of the present invention, an apparatus includes a cross member having opposite ends, a tow bar, and a tow bar caddy selectively mounted to the cross member, the longitudinal axis of the tow bar caddy being perpendicular to the longitudinal axis of the cross member. The longitudinal axis of the tow bar caddy can be mounted horizontally or vertically relative to the longitudinal axis of the cross member. The tow bar caddy having first and second sides; the first side having a plurality of apertures disposed thereon; and the second said having a plurality of apertures disposed thereon commensurate to the plurality of apertures of the first side. Additionally, it has been contemplated that the longitudinal axis of the tow bar caddy can be perpendicular to the longitudinal axis of the cross member using at least one plate or at least one cable.

In another aspect of the invention, a method is provided comprising: providing a trailer hitch assembly comprising a cross member, a tow bar, and a tow bar caddy, mounting the tow bar caddy to the cross member, and selectively adjusting the longitudinal axis of the tow bar caddy to be horizontally perpendicular or vertically perpendicular to the longitudinal axis of the cross member.

These and other objects, features, and advantages will become apparent from the following specification and drawings.

DETAILED DESCRIPTION OF THE PREFERRED EMBODIMENT

Figure 1:
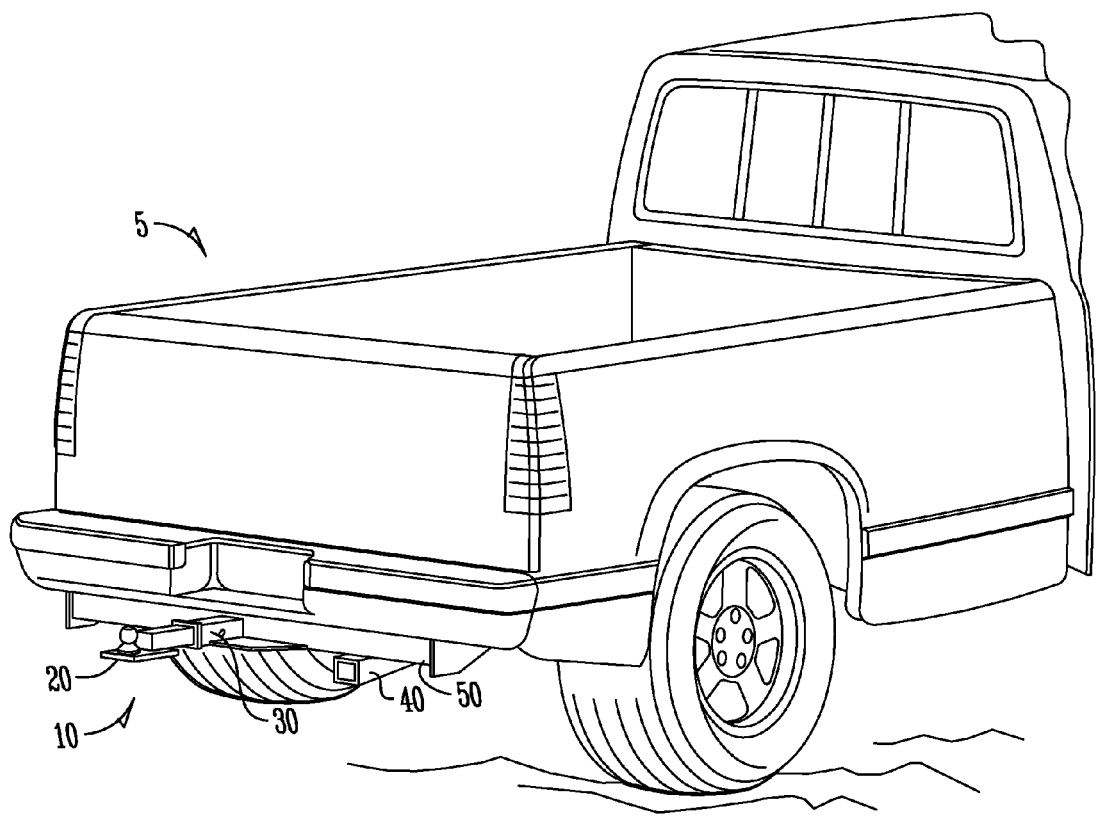
FIG. 1 is a rear perspective of a vehicle having the trailer hitch assembly of the present invention mounted thereon.

With reference to FIG. 1, an exemplary embodiment of the present invention is shown. Standard trailer hitch 10 is adapted to be secured to the rearward end of a vehicle 5. A standard trailer hitch includes a cross member 50. The cross member 50 is typically secured to the frame of the vehicle 5 by a number of fastening means. The trailer hitch has a conventional receiver 30 which receives a tow bar 20. The tow bar 20 can be any number of lengths or sizes depending on the load being pulled and be configured to be a conventional tri-ball hitch. The tow bar 20 is secured within the receiver 30 by a conventional hitch pin and clip extending through the receiver 30 and tow bar 20.

Figure 2:
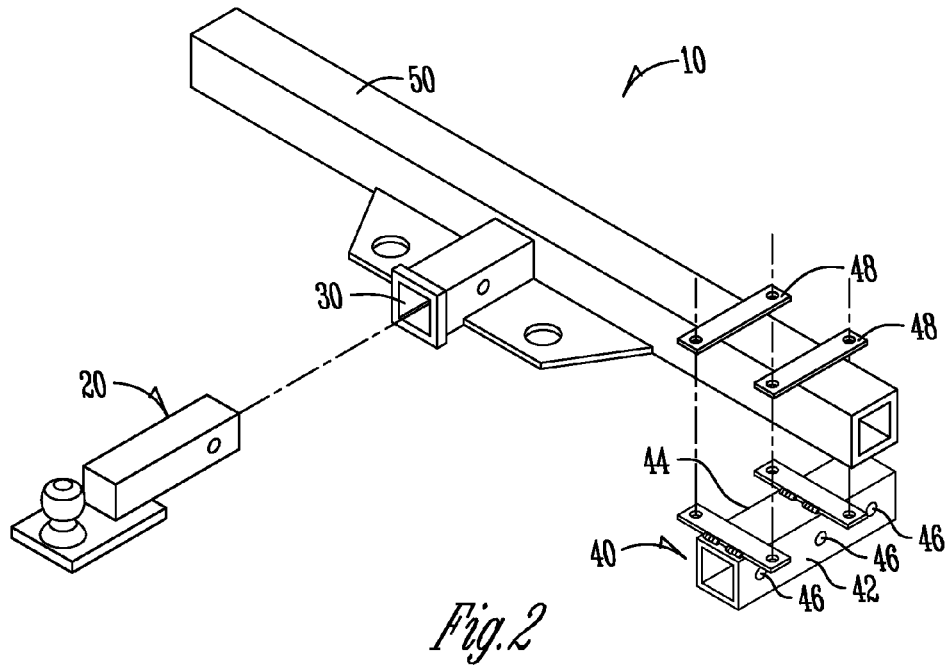
FIG. 2 is an exploded perspective view of the tow bar caddy according to a first exemplary embodiment with the longitudinal axis of the tow bar caddy mounted horizontally to the longitudinal axis of the cross member.

As can be seen in FIG. 1, when the tow bar 20 is in use and mounted in the receiver 30, the tow bar 20 extends beyond the rear of the vehicle. The hollow tow bar caddy 40 of the present invention provides a place to stow the tow bar. The tow bar caddy having a first side 42 and second side 44; the first side having a plurality of apertures 46 disposed thereon; and the second said having a plurality of apertures 46 disposed thereon commensurate to the plurality of apertures 46 of the first side 42. As can be seen in FIG. 1, the plurality of apertures 46 on first side 42 and commensurate plurality of apertures 46 on the second side 44 allow the tow bar 20 to be secured within the tow bar caddy 40 using a conventional hitch pin and clip. The tow bar caddy 40 can be adjustably secured to the cross member 50 to accommodate varying lengths and sizes of tow bars. FIG. 2 shows an exploded perspective view of the tow bar caddy. Conventional fasteners 49 can be used in conjunction with plates 48 to secure the tow bar caddy 40 to the cross member 50. The present invention contemplates that the tow bar caddy 40 can removed from one vehicle and remounted on another vehicle in a matter of minutes.

Figure 3:
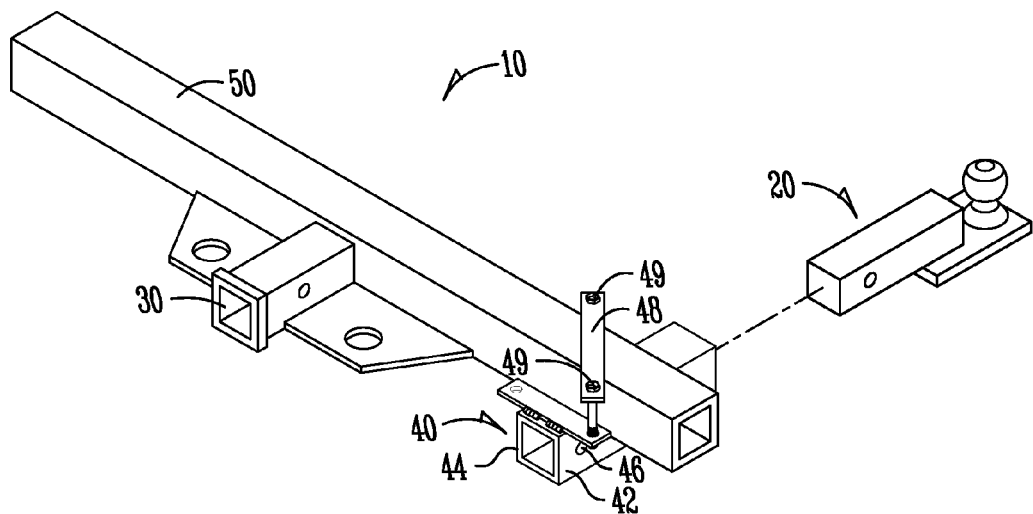
FIG. 3 is a perspective view of the tow bar caddy according to a first exemplary embodiment with the longitudinal axis of the tow bar caddy mounted horizontally to the longitudinal axis of the cross member.
Figure 4:
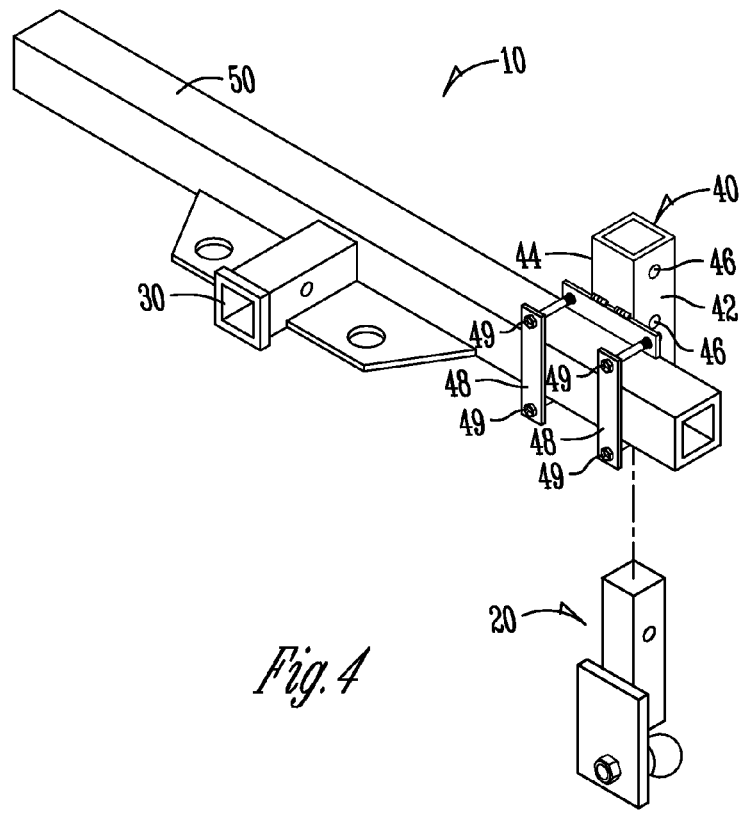
FIG. 4 is a perspective view of the tow bar caddy according to a first exemplary embodiment with the longitudinal axis of the tow bar caddy mounted vertically to the longitudinal axis of the cross member.
Figure 5:
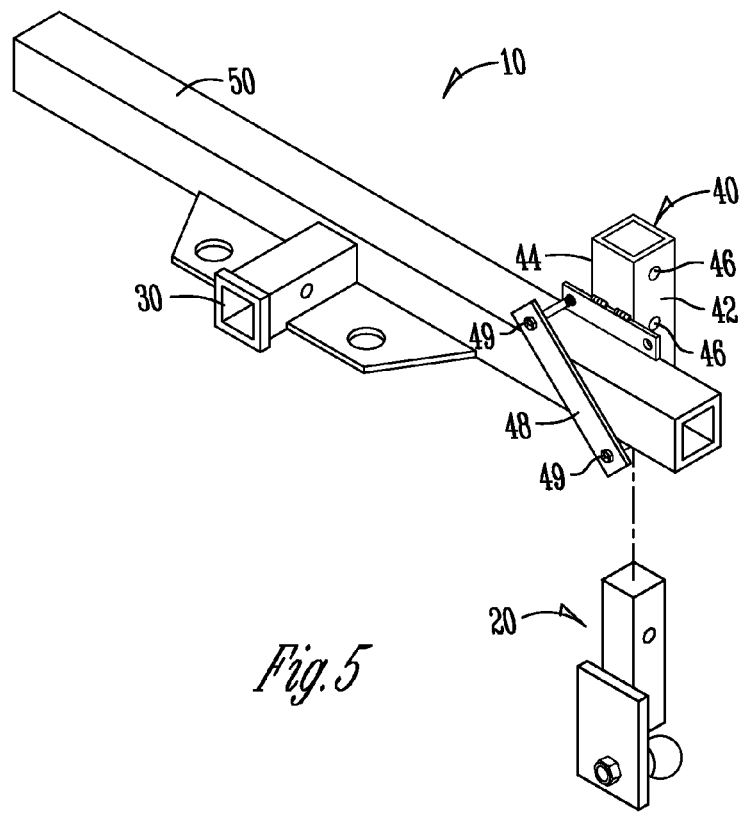
FIG. 5 is a perspective view of the tow bar caddy according to a first exemplary embodiment with the longitudinal axis of the tow bar caddy mounted vertically to the longitudinal axis of the cross member.

In an exemplary embodiment, the longitudinal axis of the tow bar caddy 20 is either vertically or horizontally perpendicular to the longitudinal axis of the cross member 50. For instance, FIG. 3 shows the tow bar caddy 40 in a horizontally perpendicular position to the cross member 50. The tow bar caddy 40 can be mounted with its longitudinal axis horizontally perpendicular to the longitudinal axis of the cross member by using a pair of plates 48 and fasteners 49 (FIG. 2) or a single plate 48 and fasteners 49 (FIG. 3). In this embodiment the tow bar 20 is inserted into the rear of the tow bar caddy 40. However, the tow bar 20 may also be inserted into the front of the tow bar caddy 40 if an obstruction is present. Moving now to FIG. 4, the longitudinal axis of the tow bar caddy 40 is vertically perpendicular position to the longitudinal axis of the cross member 50. Again, the tow bar caddy 40 can be mounted vertically perpendicular to the longitudinal axis of the cross member using a pair of plates 48 and fasteners 49 (FIG. 4) or a single plate 48 and fasteners 48 (FIG. 5). As shown in FIG. 5, a single plate 48 runs at an approximately 45 degree angle relative to the longitudinal axis of the cross member 50. In this manner, the user can better accommodate different types of tow bars and obstructions.

Figure 6:
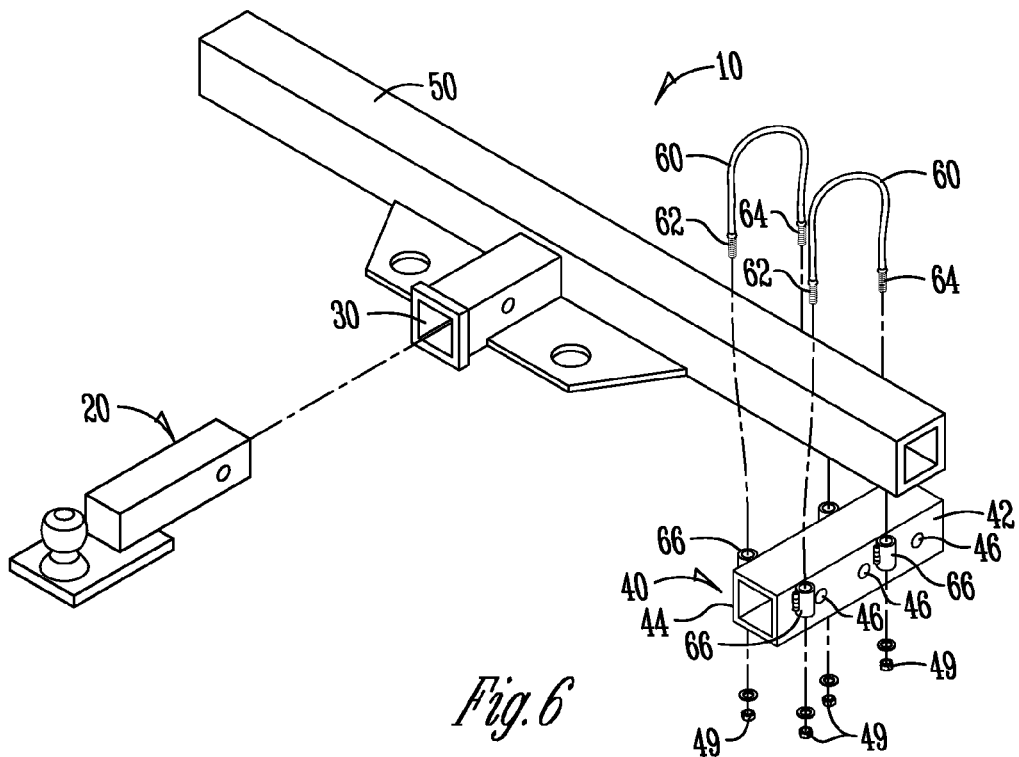
FIG. 6 is a perspective view of the tow bar caddy according to a second exemplary embodiment with the longitudinal axis of the tow bar caddy mounted horizontally to the longitudinal axis of the cross member.
Figure 7:
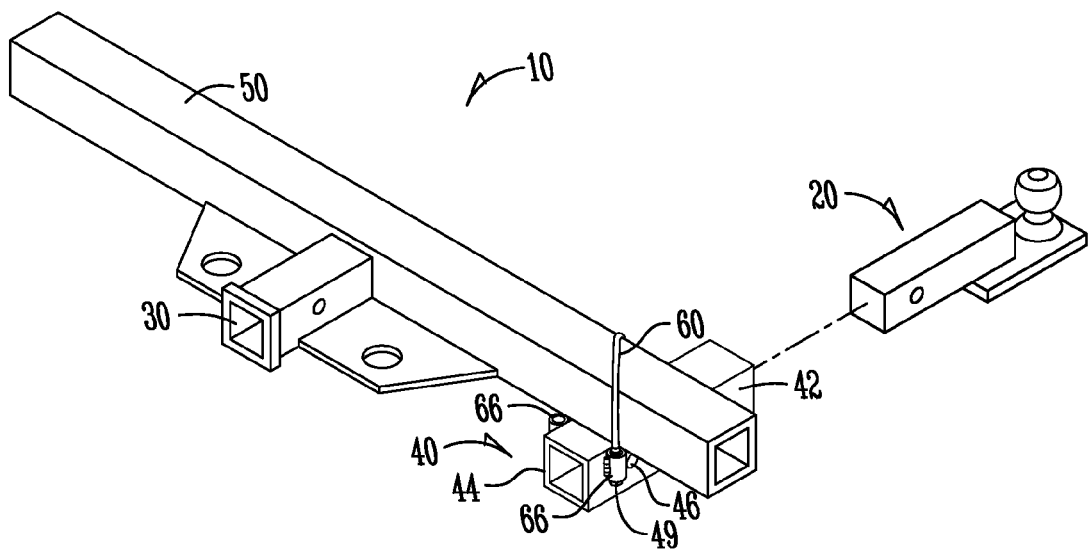
FIG. 7 is a perspective view of the tow bar caddy according to a second exemplary embodiment with the longitudinal axis of the tow bar caddy mounted horizontally to the longitudinal axis of the cross member.
Figure 8:
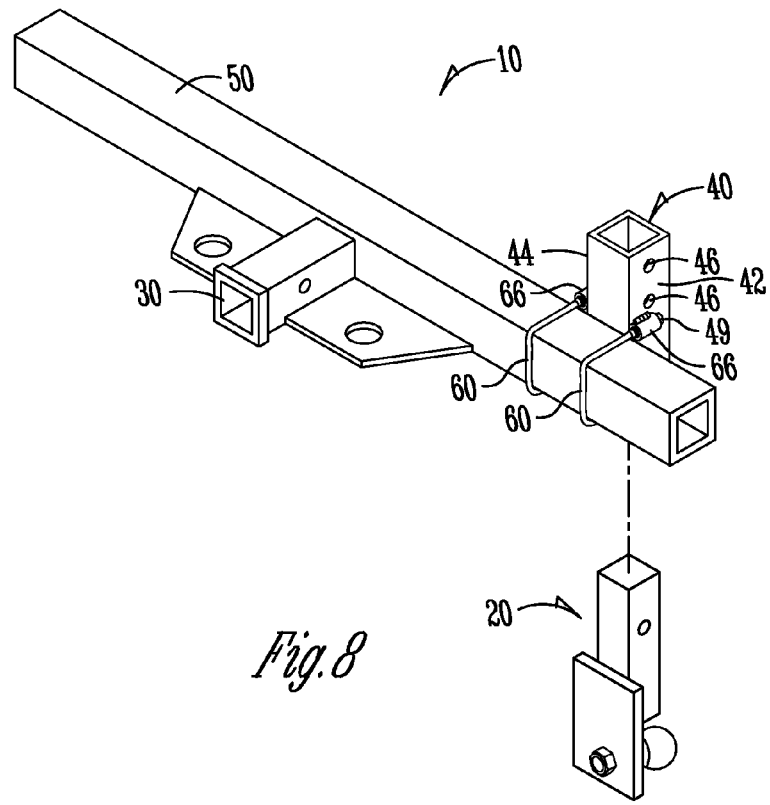
FIG. 8 is a perspective view of the tow bar caddy according to a second exemplary embodiment with the longitudinal axis of the tow bar caddy mounted vertically to the longitudinal axis of the cross member.
Figure 9:
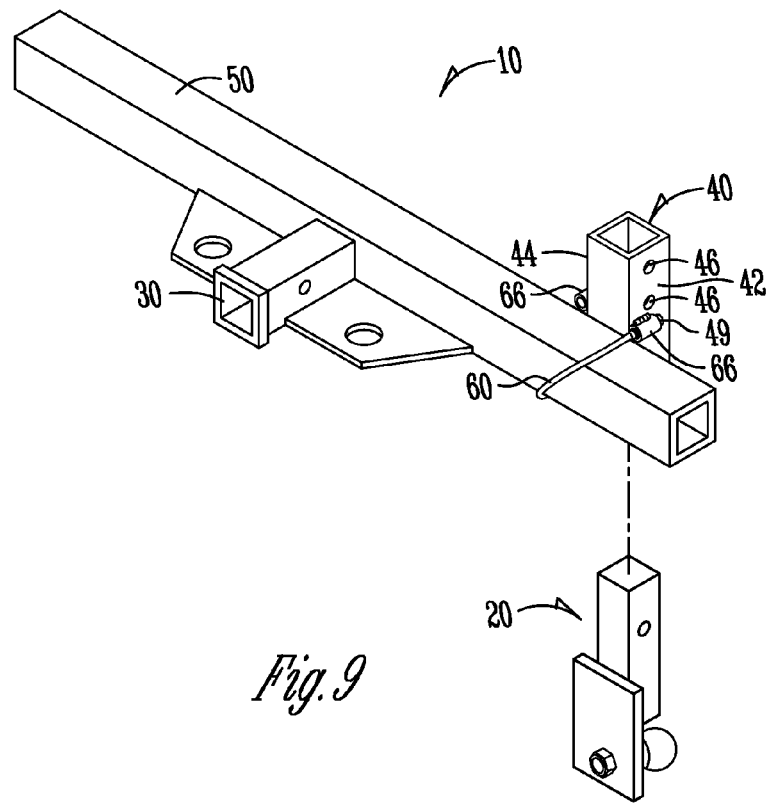
FIG. 9 is a perspective view of the tow bar caddy according to a second exemplary embodiment with the longitudinal axis of the tow bar caddy mounted vertically to the longitudinal axis of the cross member.

With reference now to FIGS. 6-9, a second embodiment of the present invention is shown. The tow bar caddy having a first side 42 and second side 44; the first side having a plurality of apertures 46 disposed thereon; and the second said having a plurality of apertures 46 disposed thereon commensurate to the plurality of apertures 46 of the first side 42. As can be seen in FIG. 1, the plurality of apertures 46 on first side 42 and commensurate plurality of apertures 46 on the second side 44 allow the tow bar 20 to be secured within the tow bar caddy 40 using a conventional hitch pin and clip. In FIG. 6, the longitudinal axis of the tow bar caddy 40 is horizontally perpendicular to the longitudinal axis of the cross member 50 by way of a pair of cables 60. Each cable 60 has a first end 62 and seconds end 64 removably attached to the tow bar caddy 40. In operation, the cable 60 is wrapped around the cross member 50 such that the ends of the cable 60 are fastened into wells 66 using a fastener 49. With respect to FIG. 8, the longitudinal axis of the tow bar caddy 40 is vertically perpendicular to the longitudinal axis of the cross member 50. As can be appreciated by a skilled artisan, any number of combinations of cables can be used. As shown in FIGS. 7 and 9, a single cable 60 is used; where in the cable runs at an approximately 45 degree angle relative to the longitudinal axis of the cross member 50. In this manner, the user can better accommodate different types of tow bars and obstructions.

Figure 10:
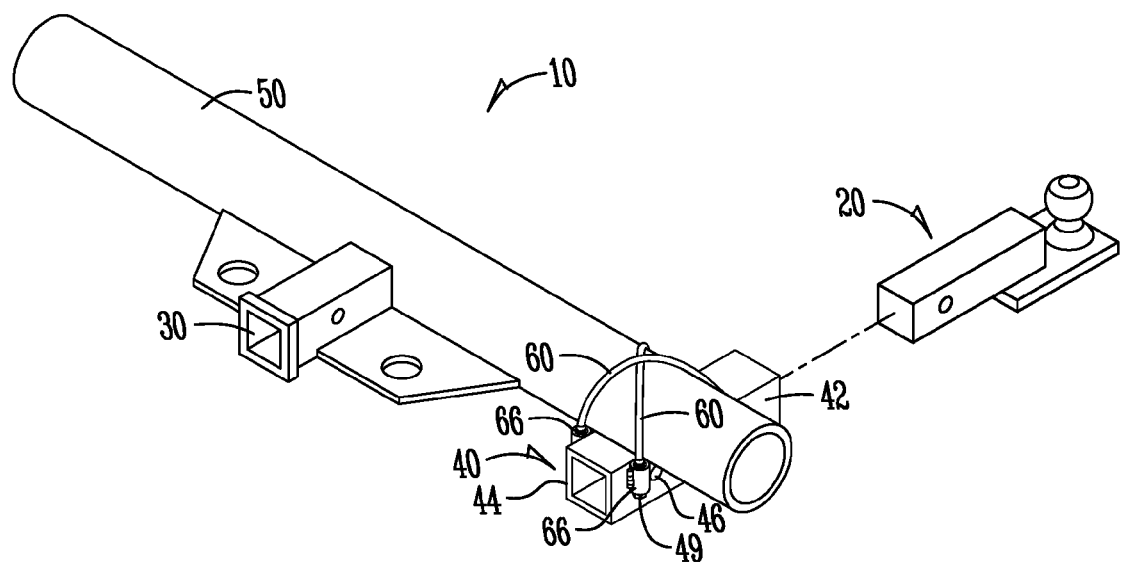
FIG. 10 is a perspective view of the tow bar caddy according to a second exemplary embodiment with the longitudinal axis of the tow bar caddy mounted horizontally to the longitudinal axis of the cross member.

FIG. 10 shows an exemplary embodiment of the present invention. Standard trailer hitch 10 is again adapted to be secured to the rearward end of a vehicle and includes a cross member 50. The cross member 50 is essentially cylindrical. In this embodiment, the tow bar caddy 40 can be mounted to the cylindrical cross member 50 using cables 60. The cables 60 may be arranged to cross over. Again, in this manner the user can better accommodate different types of tow bars and obstructions.

Further provided is a method comprising: providing a trailer hitch assembly comprising a cross member, a tow bar, and a tow bar caddy, mounting the tow bar caddy to the cross member, and selectively adjusting the longitudinal axis of the tow bar caddy to be horizontally perpendicular or vertically perpendicular to the longitudinal axis of the cross member.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An apparatus comprising:
a cross member secured to a frame of a vehicle having opposite ends;
a tow bar;
a tow bar caddy selectively and directly mounted to the cross member, the longitudinal axis of the tow bar caddy being vertically perpendicular to the longitudinal axis of the cross member; and
the tow bar being positioned in the tow bar caddy and extending downwardly.

2. An apparatus comprising:
a cross member having opposite sides and opposite ends secured to the frame of a vehicle;
a tow bar;
a tow bar caddy selectively mounted to the cross member, the longitudinal axis of the tow bar caddy being perpendicular to the longitudinal axis of the cross member;
the tow bar being positioned in the tow bar caddy;
the tow bar caddy being positioned on one of said opposite sides of said cross member;
the tow bar caddy including a well on each of the opposite sides of the tow bar caddy; and
a cable having opposite ends extends over the other opposite side of said cross member with the opposite cable ends being received in and secured to said wells on the opposite sides of the tow bar caddy.

3. The apparatus of claim 2 wherein the wells on opposite sides of said tow bar caddy are one of a pair of wells on each of said opposite sides and said cable is one of a pair of cables extending over said cross member and received in said wells on the opposite sides of said tow bar caddy.

4. The apparatus of claim 3 wherein said pair of cables crisscross each other extending over said cross member.

5. The apparatus of claim 3 wherein said pair of cables are parallel to each other extending over said cross member.

* * * * *